US012771035B2

(12) United States Patent
Vale

(10) Patent No.: US 12,771,035 B2
(45) Date of Patent: Oct. 20, 2026

(54) DIRECTION FINDING SYSTEM AND ANTENNA ARRAY

(71) Applicant: ALARIS ANTENNAS (PTY) LTD, Centurion (ZA)

(72) Inventor: Christopher Alfred Wolfgang Vale, Senderwood (ZA)

(73) Assignee: ALARIS ANTENNAS (PTY) LTD, Centurion (ZA)

( * ) Notice: Subject to any disclaimer, the term of this patent is extended or adjusted under 35 U.S.C. 154(b) by 202 days.

(21) Appl. No.: 18/657,323

(22) Filed: May 7, 2024

(65) Prior Publication Data

US 2024/0377494 A1 Nov. 14, 2024

(30) Foreign Application Priority Data

May 8, 2023 (NL) ..................................... 2034779

(51) Int. Cl.
*H01Q 9/18* (2006.01)
*G01S 3/04* (2006.01)
(Continued)

(52) U.S. Cl.
CPC ............... *H01Q 9/18* (2013.01); *G01S 3/043* (2013.01); *G01S 3/06* (2013.01); *H01Q 21/20* (2013.01);
(Continued)

(58) Field of Classification Search
CPC ...... H01Q 9/065; H01Q 9/16–20; H01Q 9/44; H01Q 21/20; H01Q 21/205; H01Q 21/293; G01S 3/043; G01S 3/06
See application file for complete search history.

(56) References Cited

U.S. PATENT DOCUMENTS 2,413,745 A * 1/1947 Carter .................. H01Q 21/205 343/807
2,910,695 A * 10/1959 Troost ....................... G01S 3/06 343/855
(Continued)

FOREIGN PATENT DOCUMENTS

CA 3016167 A1 * 2/2020 ............. H01Q 21/20
EP 3982484 A1 4/2022
(Continued)

OTHER PUBLICATIONS

Search Report for NL Application No. 2034779 dated Oct. 31, 2023, 3 pages.
(Continued)

*Primary Examiner* — Ab Salam Alkassim, Jr.
(74) *Attorney, Agent, or Firm* — Nixon & Vanderhye P.C.

(57) ABSTRACT

A direction finding antenna array comprises at least a first dipole antenna element 14, a second dipole antenna element 16 and a third dipole antenna element 18. The dipole elements comprise respective first ends 14.1, 16.1, 18.1, respective second ends 14.2, 16.2, 18.2 and a respective feed-point 14.3, 16.3, 18.3. The first, second and third dipole elements are arranged in spaced relationship relative to one another in a non-linear pattern. In respect of each dipole element in the array (and taking dipole element 14 as an example), the first end 14.1 is connected by first and second electrical connections 24, 26 to the first end of each of two adjacent dipole elements 16, 18 in the array and the second end 14.2 is connected by third and fourth electrical connections 28, 30 to the second end of each of the two adjacent dipole elements 16, 18.

17 Claims, 4 Drawing Sheets

(51) Int. Cl.
*G01S 3/06* (2006.01)
*H01Q 21/20* (2006.01)
*H01Q 21/29* (2006.01)

(52) U.S. Cl.
CPC ......... *H01Q 21/205* (2013.01); *H01Q 21/293* (2013.01)

(56) References Cited

U.S. PATENT DOCUMENTS

| | | | | | |
|---|---|---|---|---|---|
| 2,953,782 | A * | 9/1960 | Byatt | H01Q 7/00 | 343/726 |
| 3,329,954 | A * | 7/1967 | Travers | G01S 3/14 | 342/443 |
| 3,680,135 | A * | 7/1972 | Boyer | H01Q 21/20 | 343/750 |
| 3,691,561 | A * | 9/1972 | Jager | G01S 3/12 | 343/890 |
| 3,939,477 | A * | 2/1976 | Green | G01S 3/22 | 342/432 |
| 4,207,572 | A * | 6/1980 | Hipp | G01S 3/06 | 342/434 |
| 5,237,336 | A * | 8/1993 | Jelloul | G01S 3/143 | 343/835 |
| 5,300,885 | A * | 4/1994 | Bull | G01R 1/07 | 343/726 |
| 5,521,608 | A * | 5/1996 | Brandt | H01Q 21/28 | 343/810 |
| 6,211,846 | B1 * | 4/2001 | Gouin | H01Q 7/00 | 343/726 |
| 6,249,261 | B1 * | 6/2001 | Solberg, Jr. | H01Q 9/32 | 343/890 |
| 6,295,035 | B1 * | 9/2001 | Holzheimer | G01S 3/02 | 343/797 |
| 6,437,750 | B1 * | 8/2002 | Grimes | H01Q 5/40 | 343/726 |
| 6,480,168 | B1 * | 11/2002 | Lam | H01Q 1/32 | 343/874 |
| 7,123,203 | B2 * | 10/2006 | Le Geoff | H01Q 9/44 | 343/729 |
| 7,619,579 | B2 * | 11/2009 | Rahamim | H01Q 25/00 | 343/793 |
| 7,692,601 | B2 * | 4/2010 | Bisiules | H01Q 21/24 | 343/803 |
| 8,022,884 | B2 * | 9/2011 | Dumon | H01Q 9/46 | 343/729 |
| 8,686,913 | B1 * | 4/2014 | Schuman | G01S 3/143 | 342/438 |
| 8,773,315 | B2 * | 7/2014 | Lecca | H01Q 21/205 | 343/702 |
| 10,847,897 | B2 * | 11/2020 | Almog | H01Q 21/205 | |
| 2012/0086605 | A1 * | 4/2012 | Lecca | G01S 3/28 | 342/442 |
| 2012/0127046 | A1 * | 5/2012 | Lecca | G01S 3/023 | 343/703 |
| 2015/0137816 | A1 * | 5/2015 | Wiggins | H01Q 21/205 | 324/322 |
| 2017/0317415 | A1 * | 11/2017 | Galejs | H01Q 21/293 | |
| 2019/0199004 | A1 * | 6/2019 | Almog | H01Q 1/085 | |

FOREIGN PATENT DOCUMENTS

| | | | | |
|---|---|---|---|---|
| GB | 2261997 | A | 6/1993 | |
| GB | 2495093 | A * | 4/2013 | H01Q 21/0006 |
| WO | WO-8603624 | A * | 6/1986 | |
| WO | WO-2024067496 | A1 * | 4/2024 | H01Q 21/20 |

OTHER PUBLICATIONS

Written Opinion for NL Application No. 2034779 dated Oct. 31, 2023, 5 pages.

* cited by examiner

DIRECTION FINDING SYSTEM AND ANTENNA ARRAY

CROSS-REFERENCE TO RELATED APPLICATIONS

This application claims priority to NL Patent Application No. 2034779 filed May 8, 2023, the entire contents of which are hereby incorporated by reference.

INTRODUCTION AND BACKGROUND

This invention relates to antenna arrays and more particularly to antenna arrays for direction finding systems.

Direction finding (DF) antenna arrays are known. One such a known DF array is a so-called differentially fed loop array. This array comprises two differentially fed loop antennas collocated, but rotated 90 degrees with respect to each other. Each of these loops are fed at their respective left and right corners, on the same horizontal plane and with opposite polarity or out of phase, i.e. with signals that are reverse polarity to each other.

Another known DF array is a dipole antenna array which is shown in FIG. 1 hereof and which comprises five dipole elements, each comprising a respective centre feed-point, and which are arranged parallel to one another at the five corners of a pentagon. It has been found that the low-frequency DF sensitivity and cross-polarisation isolation of these arrays are not satisfactory for at least some applications. It is known that in low frequency applications, DF antenna arrays often suffer from significant coupling to a mounting structure or other nearby conductive structures. The coupling to these structures will typically have a significant impact on the ability of the DF array to accurately determine the direction of arrival of incoming signals. Low frequency, in this context, refers specifically to those frequencies where the individual elements making up the array can be considered to be electrically small compared to the wavelength of an incoming signal that is to be received.

OBJECT OF THE INVENTION

Accordingly, it is an object of the present invention to provide a direction finding antenna array with which the applicant believes the aforementioned disadvantages may at least be alleviated or which may provide a useful alternative for the known DF antenna arrays.

SUMMARY OF THE INVENTION

According to the invention there is provided a direction finding antenna array comprising at least a first dipole antenna element, a second dipole antenna element and a third dipole antenna element, each comprising respective first ends, respective second ends and a respective feed-point, wherein the first, second and third dipole elements are arranged in spaced relationship relative to one another in a non-linear pattern, wherein, in respect of each dipole element in the array: a) the first end is connected by first and second electrical connections to the first end of each of only two adjacent dipole elements respectively in the array and b) the second end is connected by third and fourth electrical connections to the second end of each of only the two adjacent dipole elements respectively.

The first end of the first antenna element may be connected by the first and second electrical connections to the first end of adjacent second and third dipole elements respectively in the array and the second end of the first dipole element may be connected by the third and fourth electrical connections to the second end of the adjacent second and third dipole elements respective.

The antenna array may comprise n dipole elements, wherein $n \geq 3$. In some embodiments $n=5$ and in other embodiments $n>5$, including, but not limited to $n=9$.

In one embodiment, the antenna array may further comprise at least fourth dipole antenna element and a fifth dipole antenna element, each comprising respective first ends, respective second ends and a respective feed-point, wherein the first, second, third, fourth and fifth linear dipole elements are arranged in spaced relationship relative to one another, wherein the first end of the fourth dipole element is connected by fifth and sixth electrical connections to respectively the first ends of the third and fifth dipole elements and wherein the second end of the fourth dipole element is connected by seventh and eighth electrical connections to respectively the second ends of the third and fifth dipole elements, wherein the first end of the fifth dipole element is connected to the first end of the second dipole element by a ninth electrical connection and wherein the second end of the fifth dipole element is connected to the second end of the second dipole element by a tenth electrical connection.

The first to fifth dipole elements may be located at respective corners of a pentagon.

Each of the dipole elements may be linear in configuration.

The linear dipole elements may be arranged vertically and parallel to one another.

Each electrical connection may comprise an elongate conductor.

In some embodiments, at least some electrical connections may comprise a filter circuit.

The respective feed-points may located in a common plane.

Also included within the scope of the invention is a direction finding system comprising a direction finding antenna array as defined above and wherein the respective feed points are connected to respective inputs of coherent receivers of a receiver arrangement.

The receiver arrangement may comprise a processor for executing a computer program comprising correlative direction-finding algorithms.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 2:
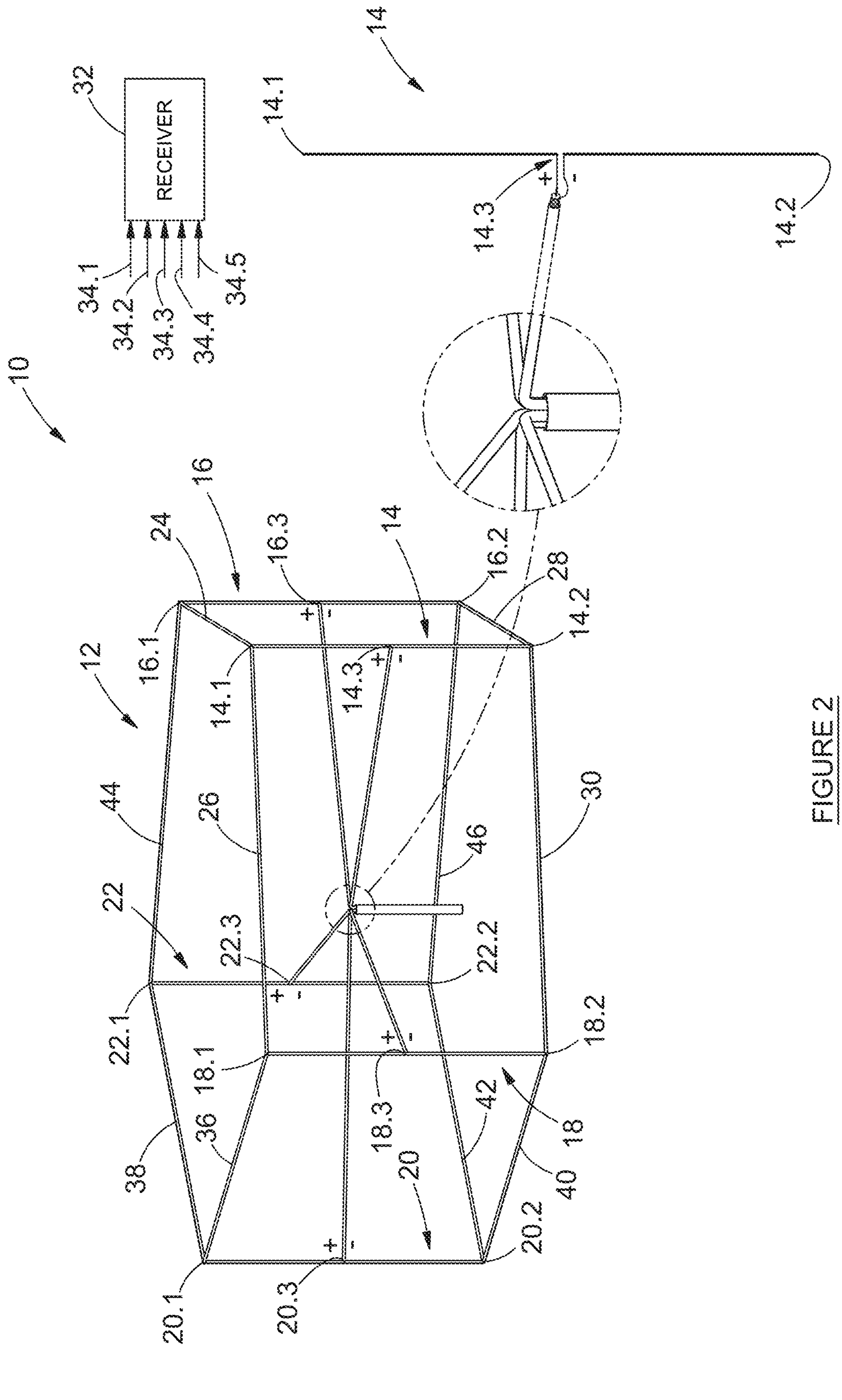
FIG. 2 is a diagrammatic representation of an example embodiment of a direction finding (DF) antenna array according to the invention.

An example embodiment of a direction finding (DF) system 10 and an antenna array 12 therefor are shown in FIG. 2.

The DF system 10 comprises the DF antenna array 12 connected to a receiver arrangement 32. The DF antenna array comprises at least a first dipole antenna element 14, a second dipole antenna element 16 and a third dipole antenna element 18. The dipole elements comprise respective first ends 14.1, 16.1, 18.1, respective second ends 14.2, 16.2, 18.2 and a respective feed-point 14.3, 16.3, 18.3. The first, second and third dipole elements are arranged in spaced relationship relative to one another in a non-linear pattern. In respect of each dipole element in the array (and taking dipole element 14 as an example), the first end 14.1 is connected by first and second electrical connections 24, 26 to the first end of each of two adjacent dipole elements 16, 18 in the array and the second end 14.2 is connected by third and fourth electrical connections 28, 30 to the second end of each of the two adjacent dipole elements 16, 18.

The receiver arrangement 32 comprises at least three receivers having respective inputs 34.1, 34.2, 34.3 which are respectively connectable to the feed-points 14.3, 16.3, 18.3, respectively.

In a preferred example embodiment as shown in FIG. 2, the antenna array 12 further comprises a fourth dipole antenna element 20 and a fifth dipole antenna element 22. The dipole elements comprise respective first ends 20.1, 22.1, respective second ends 20.2, 22.2 and a respective feed-point 20.3, 22.3. The first, second, third, fourth and fifth dipole elements are arranged in spaced relationship relative to one another. The first end 20.1 of the fourth dipole element 20 is connected by fifth and sixth electrical connections 36, 38 to respectively the first ends 18.1, 22.1 of the third and fifth dipole elements. The second end 20.2 of the fourth dipole element 20 is connected by seventh and eighth electrical connections 40, 42 to respectively the second ends 18.2, 22.2 of the third and fifth dipole elements. The first end 22.1 of the fifth dipole element 22 is connected to the first end 16.1 of the second dipole element 16 by a ninth electrical connection 44 and the second end 22.2 of the fifth dipole element 22 is connected to the second end 16.2 of the second dipole element 16 by a tenth electrical connection 46.

In this preferred embodiment, the receiver arrangement 32 further comprises fourth and fifth receivers with respective inputs 34.4, 34.5 which are respectively connected to the respective feed-points 20.3, 22.3. The dipole element need not be, but preferably are linear in configuration.

As shown in FIG. 2, the first to fifth linear dipole elements 12, 14, 16, 18, 20 and 22 are located at respective corners of a pentagon. The first to fifth dipole elements are arranged vertically and parallel to one another. First parts of each linear dipole element extend from the respective feed-point upwardly to terminate at the first ends and second parts extend from the respective feed-point downwardly to terminate at the second end.

Each of the first to tenth electrical connections 24, 26, 28, 20, 36, 38, 40, 42, 44 and 46 comprises a linear elongate conductor. In other embodiments, at least some of the elongate electrical connections may comprise a filter circuit.

The respective feed-points 14.3, 16.3, 18.3, 20.3, 22.3 are located in a common plane.

There is hence provided a closed structure comprising the vertically extending linear dipole elements 12, 14, 16, 18, 20 and 22 and the horizontally extending elongate electrical connections 24, 26, 28, 20, 36, 38, 40, 42, 44 and 46 between the ends of adjacent linear dipole elements. The resulting loop-like elements (such as the loop-like element formed by linear dipole element 14, elongate electrical connection 26, linear dipole element 18, and elongate electrical connection 30) in the structure is not a pure loop construction, in the sense that it will not work as a single loop element. The arrangement has, as a necessary feature, connections of a loop-like element to its neighbouring loop-like elements to form a closed structure 12 consisting of many (in this example embodiment five (5)) of these loop-like elements. This structure is clearly distinguishable from other loop structures such as a differentially fed loop, and other traditional loop designs which are always used as stand-alone elements.

The receiver arrangement 32 may comprise a processor (not shown) and the processor may execute a computer program comprising correlative direction-finding algorithms. All the feed points 14.3 to 22.3 of the array 12 are directly connected to respective coherent receivers of the arrangement 32 and allow for multiple combinations to be generated in software (after digitization). In contrast, differentially fed loops impose a fixed 180 degree phase shift which is then combined into a single feed point into a receiver.

The fact that each of the feed points 14.3 to 22.3 are connected to a respective coherent receiver is of particular importance, since the physical/galvanic connection between the linear dipole elements allows for multiple feed points along the array to act as pairs that create unique and information rich sources. For example, adjacent feed points 14.3 and 16.3 create a small loop that will have a significantly different radiation pattern when combined, compared to feed points 14.3 and 18.3, which create a much larger loop-like structure compared to the combined feed points 14.3 and 16.3. In both cases, the resulting radiation pattern, and consequently the nature of the information available to the DF algorithm, is fundamentally different from those of either a traditional loop or dipole array.

Figure 1:
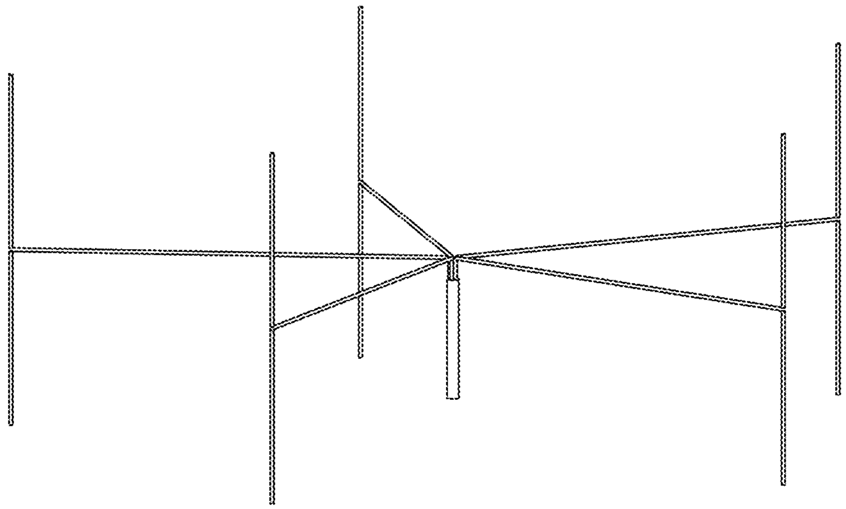
FIGURE 1 (PRIOR ART)
FIG. 1 is a diagrammatic representation of a prior art multiple dipole DF antenna array.
Figure 3:
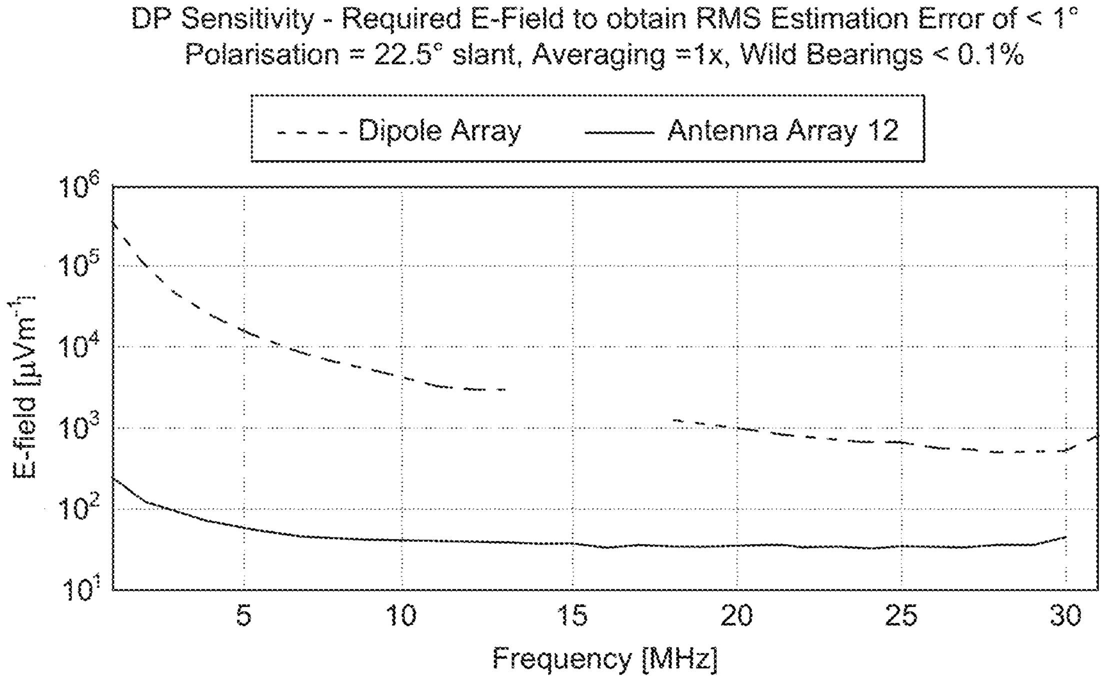
FIG. 3 is a comparative graph of DF sensitivity v frequency for the DF antenna array in FIG. 2 and for the prior art multiple dipole DF antenna array in FIG. 1.

Although the electrical inter-connection of neighbouring dipole elements in DF dipole arrays is generally considered by those skilled in the art to be detrimental to the overall performance of the array, it has been found by the applicant, surprisingly so, that the low-frequency performance, more particularly the low-frequency DF sensitivity, the cross-polarisation isolation and susceptibility to coupling to conductive array mounting structures of the antenna array 12 is substantially better than that of the prior art dipole array in FIG. 1. This unexpected improved performance is graphically illustrated by the simulated results in FIG. 3, where the sensitivity of the prior art dipole array of FIG. 1 is shown in broken lines and the sensitivity of the array 12 is shown in solid lines. The improvement at frequencies smaller than 100 MHz is self-evident. In the simulation an array 12 with dipole elements of 500 mm in length (which is $\lambda/20$ at 30 MHZ) and an array diameter of 1200 mm were used.

Figure 4:
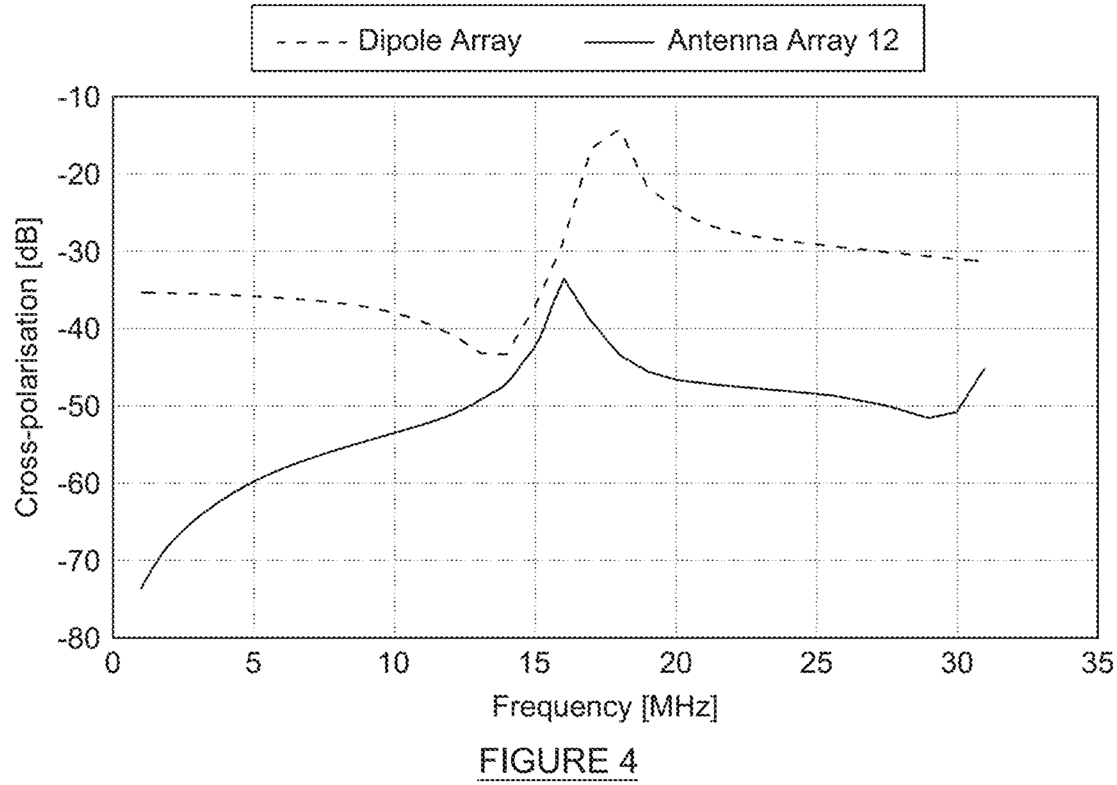
FIG. 4 is a comparative graph of normalized cross-polarization isolation v frequency of the DF antenna array in FIG. 2 and for the prior art multiple dipole DF antenna array in FIG. 1.

The simulated results in FIG. 4 exhibit an unexpected improvement in cross-polarisation isolation of roughly 10 dB of the antenna array 12 over that of the conventional dipole array for frequencies below 10 MHz, where the isolation of the prior art dipole array of FIG. 1 is shown in broken lines and the isolation of the array 12 is shown in solid lines.

Figure 5:
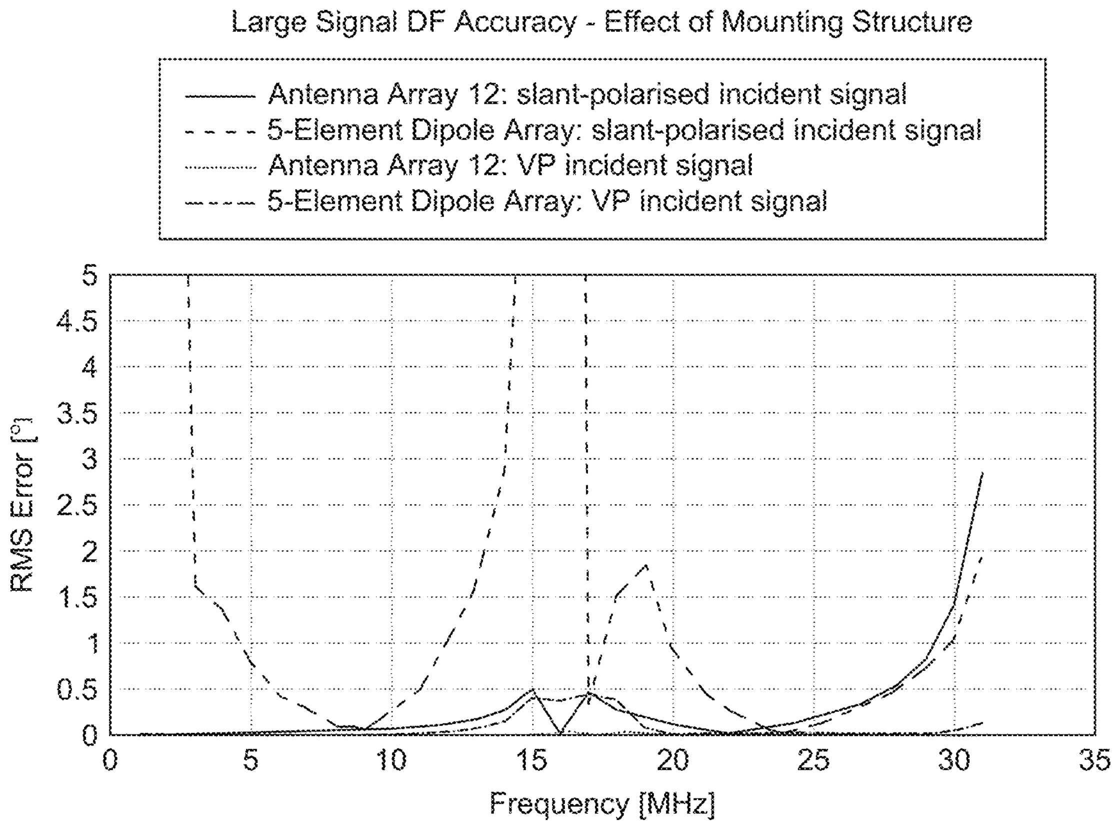
FIG. 5 is a comparative graph of DF accuracy of the DF antenna array in FIG. 2 and for the prior art multiple dipole DF antenna array in FIG. 1.

The antenna array 12 exhibits superior immunity to central mounting structures compared to that of conventional dipole arrays, as can be seen from the simulated results in FIG. 5 below. Note that the DF accuracy of the array 12 stays below 0.5 deg for both vertically polarized (VP) and slant-polarised signals, while the prior art dipole array suffers from a fatal breakdown in accuracy when exposed to a slant-polarised signal. This breakdown is caused by the presence of the mounting structure, whereas the array 12 appears to be immune to the presence of the mounting structure.

The invention claimed is:

1. A direction finding antenna array comprising at least a first dipole antenna element, a second dipole antenna element and a third dipole antenna element, each comprising respective first ends, respective second ends and a respective feed-point, wherein the first, second and third dipole elements are respectively located at different corners of a polygon and no two of the dipole elements intersect one another, wherein, in respect of each dipole element in the array:

a) the first end is connected by two electrical connections to the first end of each of only two adjacent dipole elements respectively in the array, and b) the second end is connected by two electrical connections to the second end of each of only the two adjacent dipole elements respectively.

2. The antenna array as claimed in claim 1 wherein the first end of the first antenna element is connected by a first and a second electrical connection to the first end of adjacent second and third dipole elements respectively in the array, and the second end of the first dipole element is connected by a third and a fourth electrical connection to the second end of the adjacent second and third dipole elements respectively.

3. The direction finding antenna array as claimed in claim 2 wherein the antenna array further comprises at least a fourth dipole antenna element and a fifth dipole antenna element, each comprising respective first ends, respective second ends and a respective feed-point, wherein the first, second, third, fourth and fifth dipole elements are respectively located at respective corners of a pentagon and no two of the dipole elements intersect each other, wherein the first end of the fourth dipole element is connected by a fifth and a sixth electrical connection to respectively the first ends of the third and fifth dipole elements, and wherein the second end of the fourth dipole element is connected by a seventh and an eighth electrical connection to respectively the second ends of the third and fifth dipole elements, wherein the first end of the fifth dipole element is connected to the first end of the second dipole element by a ninth electrical connection and wherein the second end of the fifth dipole element is connected to the second end of the second dipole element by a tenth electrical connection.

4. The direction finding antenna array as claimed in claim 1 wherein the dipole elements are linear in configuration.

5. The direction finding antenna array as claimed in claim 1 wherein each electrical connection comprises an elongate conductor.

6. The direction finding antenna array as claimed in claim 1 wherein at least some electrical connections comprise a filter circuit.

7. The direction finding antenna array as claimed in claim 1 wherein the respective feed-points are located in a common plane.

8. A direction finding system comprising a direction finding antenna array as claimed in claim 1 and wherein the respective feed points are connected to respective inputs of coherent receivers of a receiver arrangement.

9. The direction finding system as claimed in claim 8 wherein the receiver arrangement comprises at least one processor for executing a computer program comprising correlative direction-finding algorithms.

10. A direction finding antenna array comprising at least a first linear dipole antenna element, a second linear dipole antenna element and a third linear dipole antenna element, each comprising respective first ends, respective second ends and a respective feed-point, wherein the first, second and third linear dipole elements are arranged in spaced relationship relative to one another in a non-linear pattern, wherein, in respect of each linear dipole element in the array:

a) the first end is connected by two electrical connections to the first end of each of only two adjacent linear dipole elements respectively in the array, and b) the second end is connected by two electrical connections to the second end of each of only the two adjacent linear dipole elements respectively, wherein the linear dipole elements are arranged vertically and parallel to one another.

11. A direction finding system comprising:

a first dipole antenna element comprising a respective first end, second end and feed-point;

a second dipole antenna element comprising a respective first end, second end and feed-point;

a third dipole antenna element comprising a respective fifth end, second end and feed-point; and a coherent receiver having first, second and third inputs connected to the feed-points of the first dipole antenna element, the second dipole antenna element and the third dipole antenna element respectively;

wherein the first, second and third dipole elements are respectively located at different corners of a polygon and no two of the dipole elements intersect one another, wherein the first end of the first dipole antenna element is connected by a first electrical connection to the first end of the second dipole antenna element and the second end of the first dipole antenna element is connected by a second electrical connection to the second end of the second dipole antenna element is to form a first loop-like element;

wherein the first end of the first dipole antenna element is connected by a third electrical connection to the first end of the third dipole antenna element and the second end of the first dipole antenna element is connected by a fourth electrical connection to the second end of the third dipole antenna element to form a second loop-like element.

12. The direction finding system as in claim 11 wherein:

the antenna array further comprises at least a fourth dipole antenna element and a fifth dipole antenna element, each comprising respective first ends, respective second ends and a respective feed-point, the first, second, third, fourth and fifth dipole elements are respectively located at a respective corner of a pentagon and no two of the dipole elements intersect one another, the first end of the fourth dipole element is connected by a fifth and a sixth electrical connection to respectively the first ends of the third and fifth dipole elements, the second end of the fourth dipole element is connected by a seventh and an eighth electrical connection to respectively the second ends of the third and fifth dipole elements, the first end of the fifth dipole element is connected to the first end of the second dipole element by a ninth electrical connection, and the second end of the fifth dipole element is connected to the second end of the second dipole element by a tenth electrical connection.

13. The direction finding system as in claim 11 wherein the dipole elements are linear in configuration.

14. A direction finding system as in claim 13 wherein the linear dipole elements are arranged vertically and parallel to one another.

15. The direction finding system as in claim 11 wherein each electrical connection comprises an elongate conductor.

16. The direction finding system as in claim 11 wherein at least some of the electrical connections comprise a filter circuit.

17. The direction finding system as in claim 11 wherein the respective feed-points are located in a common plane.

* * * * *